«12» United States Patent
Lipsky et al.

(10) Patent No.: US 8,949,380 B2
(45) Date of Patent: Feb. 3, 2015

(54) METHOD AND SYSTEM FOR DISTRIBUTING IMAGES TO CLIENT SYSTEMS

(75) Inventors: Scott E. Lipsky, Seattle, WA (US); Paul Brownlow, Seattle, WA (US)

(73) Assignee: Eqapez Foundation, L.L.C., Dover, DE (US)

( * ) Notice: Subject to any disclaimer, the term of this patent is extended or adjusted under 35 U.S.C. 154(b) by 2526 days.

(21) Appl. No.: 10/675,925

(22) Filed: Sep. 29, 2003

(65) Prior Publication Data

US 2005/0071880 A1  Mar. 31, 2005

(51) Int. Cl.
*G06F 15/177* (2006.01)
*G06T 13/80* (2011.01)
*G11B 27/32* (2006.01)
*G06F 3/0481* (2013.01)
*G11B 27/034* (2006.01)

(52) U.S. Cl.
CPC .............. *G06T 13/80* (2013.01); *G11B 27/329* (2013.01); *G06F 3/0481* (2013.01); *G06F 2203/04806* (2013.01); *G11B 27/034* (2013.01)
USPC ............. 709/220; 709/223; 709/224; 725/87; 725/86

(58) Field of Classification Search
USPC .......... 709/220, 223, 224; 725/86, 87; 714/47
See application file for complete search history.

(56) References Cited

U.S. PATENT DOCUMENTS

| 5,712,961 A | 1/1998 | Matsuo |
| 5,781,716 A * | 7/1998 | Hemphill et al. ................. 714/4 |
| 5,806,005 A | 9/1998 | Hull et al. |
| 5,867,729 A | 2/1999 | Swonk |
| 6,370,656 B1 | 4/2002 | Olarig et al. |
| 6,442,573 B1 | 8/2002 | Schiller et al. |
| 6,617,879 B1 * | 9/2003 | Chung ............................ 326/82 |
| 6,745,242 B1 * | 6/2004 | Schick et al. ................. 709/224 |
| 6,854,010 B1 * | 2/2005 | Christian et al. ............. 709/223 |
| 6,873,988 B2 | 3/2005 | Herrmann et al. |
| 7,007,047 B2 * | 2/2006 | Zelenka et al. ............... 707/204 |
| 7,047,551 B2 | 5/2006 | Ogawa et al. |
| 7,082,130 B2 | 7/2006 | Borella et al. |
| 7,110,982 B2 | 9/2006 | Feldman et al. |
| 7,146,541 B2 | 12/2006 | Blumberg et al. |
| RE39,526 E | 3/2007 | Hull et al. |
| 7,213,246 B1 * | 5/2007 | van Rietschote et al. ......... 718/1 |
| 7,242,421 B2 | 7/2007 | Center et al. |

(Continued)

OTHER PUBLICATIONS

Non-Final Office Action for U.S. Appl. No. 10/702,105; Date of Mailing: Mar. 9, 2010; 13 pgs.

(Continued)

*Primary Examiner* — Tammy Nguyen
(74) *Attorney, Agent, or Firm* — Perkins Coie LLP

(57) ABSTRACT

A method and system for distributing images for display by client systems. A distribution system includes an image server system that is connected to image client systems via a communications link, such as the Internet. The image server system is responsible for providing image packages to the image client systems and for collecting information from the image client systems. Each image client system periodically sends a heartbeat communication to the image server system. Upon receiving a heartbeat communication, the image server system determines the state of the image client system that sent the heartbeat communication and responds appropriately. The response may include instructions for the image client system to retrieve new images, to retrieve software updates, to send usage data, and so on.

29 Claims, 6 Drawing Sheets

(56) References Cited

U.S. PATENT DOCUMENTS

| | | | |
|---|---|---|---|
| 7,244,230 | B2 | 7/2007 | Duggirala et al. |
| 7,295,511 | B2 | 11/2007 | Sharma et al. |
| 7,308,487 | B1 | 12/2007 | Dansie et al. |
| 7,620,701 | B2 | 11/2009 | Niimura |
| 7,779,090 | B2 | 8/2010 | Lipsky et al. |
| 7,937,470 | B2 | 5/2011 | Curley et al. |
| 2002/0013897 | A1* | 1/2002 | McTernan et al. ............ 713/153 |
| 2002/0056123 | A1* | 5/2002 | Liwerant et al. ................ 725/87 |
| 2002/0152432 | A1* | 10/2002 | Fleming ........................... 714/47 |
| 2002/0163672 | A1 | 11/2002 | Yoshida et al. |
| 2003/0023846 | A1 | 1/2003 | Krishna et al. |
| 2003/0069962 | A1 | 4/2003 | Pandya |
| 2003/0110503 | A1* | 6/2003 | Perkes ............................ 725/86 |
| 2003/0191805 | A1* | 10/2003 | Seymour et al. ............. 709/204 |
| 2004/0015554 | A1 | 1/2004 | Wilson |
| 2004/0152451 | A1 | 8/2004 | Park |
| 2005/0071867 | A1 | 3/2005 | Lipsky et al. |
| 2005/0086357 | A1 | 4/2005 | Lipsky et al. |
| 2007/0036086 | A1 | 2/2007 | Walter et al. |
| 2007/0229652 | A1 | 10/2007 | Center et al. |
| 2010/0312819 | A1 | 12/2010 | Lipsky et al. |

OTHER PUBLICATIONS

United States Patent and Trademark Office, Non-Final Office Action, U.S. Appl. No. 10/702,105, mailed Feb. 15, 2013, 13 pages.
United States Patent and Trademark Office, Restriction Requirement, U.S. Appl. No. 12/858,368, mailed Feb. 27, 2013, 7 pages.
United States Patent and Trademark Office, Final Office Action, U.S. Appl. No. 10/702,105, mailed Feb. 6, 2012, 14 pages.
United States Patent and Trademark Office, Non-Final Office Action, U.S. Appl. No. 10/702,105, mailed Feb. 22, 2012, 14 pages.
United States Patent and Trademark Office, Notice of Allowance, U.S. Appl. No. 12/858,368, mailed Jul. 1, 2013, 29 pages.
United States Patent and Trademark Office, Non-Final Office Action, U.S. Appl. No. 10/702,105, mailed Aug. 23, 2012, 17 pages.
United States Patent and Trademark Office, Restriction Requirement, U.S. Appl. No. 10/702,105, mailed Aug. 18, 2010, 5 pages.
United States Patent and Trademark Office, Final Office Action, U.S. Appl. No. 10/702,105, mailed Jan. 5, 2011, 10 pages.
United States Patent and Trademark Office, Advisory Action, U.S. Appl. No. 10/702,105, mailed Mar. 23, 2011, 3 pages.
United States Patent and Trademark Office, Final Office Action, U.S. Appl. No. 10/702,105, mailed May 16, 2011, 12 pages.
United States Patent and Trademark Office, Final Office Action, U.S. Appl. No. 10/702,105, mailed Jun. 23, 2011, 12 pages.
United States Patent and Trademark Office, Final Office Action, U.S. Appl. No. 10/702,105, mailed Sep. 12, 2011, 12 pages.
United States Patent and Trademark Office, Final Office Action, U.S. Appl. No. 10/702,105, mailed Jan. 2, 2014, 23 pages.
United States Patent and Trademark Office, Non-Final Office Action, U.S. Appl. No. 10/702,106, mailed Aug. 5, 2008, 12 pages.
United States Patent and Trademark Office, Final Office Action, U.S. Appl. No. 10/702,106, mailed Mar. 24, 2009, 13 pages.
United States Patent and Trademark Office, Advisory Action, U.S. Appl. No. 10/702,106, mailed Jun. 3, 2009, 3 pages.
United States Patent and Trademark Office, Non-Final Office Action, U.S. Appl. No. 10/702,106, mailed Jul. 8, 2009, 13 pages.
United States Patent and Trademark Office, Restriction Requirement, U.S. Appl. No. 10/702,106, mailed Mar. 9, 2010, 5 pages.
United States Patent and Trademark Office, Notice of Allowance, U.S. Appl. No. 10/702,106, mailed Apr. 16, 2010, 5 pages.

\* cited by examiner

US 8,949,380 B2

METHOD AND SYSTEM FOR DISTRIBUTING IMAGES TO CLIENT SYSTEMS

TECHNICAL FIELD

The described technology relates generally to the distribution of content and particularly to the distribution of images to client systems.

BACKGROUND

The displaying of paintings, sketches, photograph, and other images is very popular in business and personal settings. For example, most homes and offices have paintings or photographs on their walls. It can be very expensive, however, to purchase, maintain, and display high-quality paintings— so much so that most businesses and families cannot afford to do so. As a result, most images that are displayed are low-cost reproductions of high-quality images or originals of low-quality paintings. Because viewers can tire of seeing the same painting on a daily basis, some businesses change the location of the paintings that they display to provide more variety to their customers and employees.

Various electronic means have been used to display image to help reduce the cost of displaying images and increase the variety of images that are displayed. For example, slide programs for general-purpose computers have been developed to display images (e.g., stored in JPEG format) on display device such as a computer monitor. These slide shows typically cycle through displaying a set of images (e.g., defined by a display list) at a fixed rate. Some electronic frames have been developed that allow a user to upload their own photographs for display on a screen within the frame. These electronic frames can, much like a slide show program, cycle through displaying a set of photographs. It can be a time-consuming process, however, to change the set of images that are displayed either by a slide show program or an electronic picture frame. To change a set of images, a person may to search for, pay for, and download an electronic version of an image and create a display list that includes that image.

These current means for displaying images have disadvantages that relate primarily to variety and quality of the images that can be displayed in a cost-effective manner. It would be desirable to have a system that would allow for the electronic display of a wide variety of high-quality images in way that requires very little user interaction and is cost effective.

DETAILED DESCRIPTION

Figure 1:
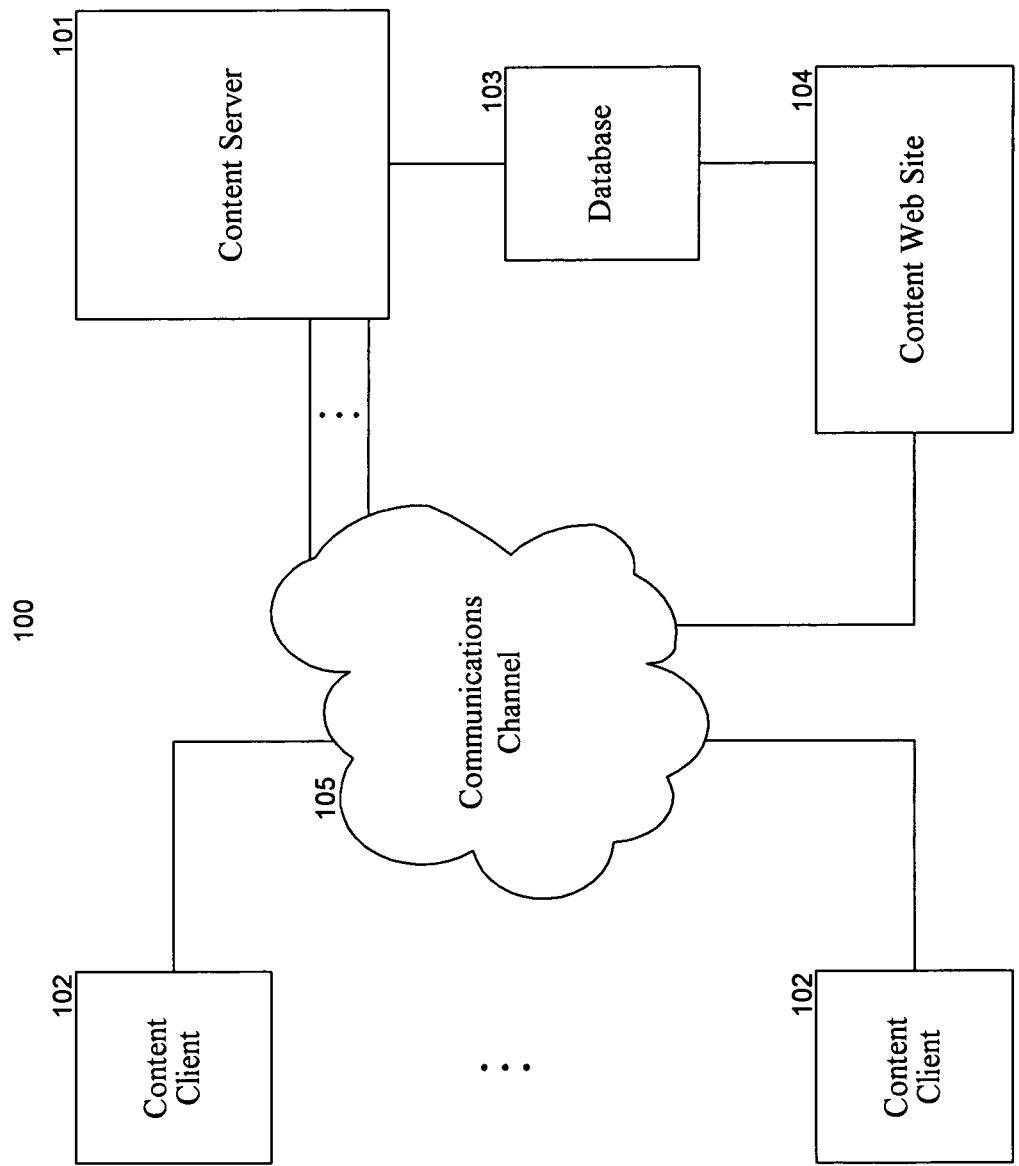
FIG. 1 is a block diagram illustrating components of the distribution system in one embodiment.

A method and system for distributing images for display by client systems is provided. In one embodiment, a distribution system includes an image server system that is connected to image client systems via a communications link, such as the Internet. Each image client system is connected to a display device (e.g., high-resolution, flat-panel monitor) and includes an image store and a display component. The display component periodically retrieves images from the image store and displays those images on the display device. The image server system is responsible for providing image packages to the image client systems and for collecting information (e.g., usage data) from the image client systems. Each image client system periodically sends a heartbeat communication to the image server system. Upon receiving a heartbeat communication, the image server system determines the state of the image client system that sent the heartbeat communication and responds appropriately. The response may include instructions for the image client system to retrieve new images, to retrieve software updates, to send usage data, and so on. If the response includes instructions to retrieve images, then the image client system sends a heartbeat communication to the image server system requesting the retrieval of images. If the response includes instructions to send usage information, then the image client system collects the information and sends it to the image server system via a heartbeat communication. If the response includes instructions to retrieve software updates, then the image client system sends a heartbeat communication to the image server system requesting the software updates. The image server system and each image client system communicate via sessions that includes multiple heartbeat communications sent by the client system and responses sent by the server system. In a response to a heartbeat communication, the image server system may direct an image client system to communicate with another server at a designated address to, for example, send usage data for storage by the server. The image client systems may periodically send heartbeat communications so that the image server system can provide instructions to the image client systems. In this way, the image server system can provide updated image information to the image client systems via the Internet and in real time.

In one embodiment, the distribution system distributes image packages via either an electronic means (e.g., via the Internet) or a physical means (e.g., via a CD-ROM) depending on whether a client system has recently communicated electronically with the server system. The server system tracks the heartbeat communications received from each client system. When the server system is a ready to distribute image packages (or software updates) to a client system, the server system determines whether the client system has recently communicated electronically with the server system via a communications link. If so, the server system attempts to send the image package to the client system via the communications link, for example, when the next heartbeat communication is received from the client system. Upon receiving the image package, the client system can update its image store so that it can start displaying the images included in the package. If the client system has not recently communicated electronically with the server system, then the server system stores the image package on a physical computer-readable medium, such as a DVD or CD-ROM. The server system then directs the delivery of the computer-readable medium via conventional means, such as the Postal Service, to the customer who controls the client system. The customer, upon receiving the computer-readable media, can then install the image package on the client system. In this way, the distribution system can automatically determine whether image packages or other packages are to be delivered via a communications link or via a physical medium.

In one embodiment, the distribution system employs various techniques to ensure the security and integrity of the distribution of the images. The distribution system may encrypt each image package before it is distributed to a client system. The distribution may assign a public and private key pair to each client system and encrypt the image packages using the public key for a client system. The distribution system may also digitally sign the image packages using a private key of the distribution system. When a client system receives an image package sent electronically or via a physical medium, the client system can decrypt the image package using its private key and check the digital signature using the public key of the distribution server. Thus, encryption and signing of the image packages can help ensure that the images even if intercepted cannot be used in an unauthorized manner and that an unauthorized server cannot impersonate the distribution system. The distribution system can use various recovery techniques to ensure the proper and timely transmission of data between the server system and the client system. For example, the server system can send an image package to a client system via a session comprising a series of responses to heartbeat communications. If the session is interrupted (e.g., because the client system went offline), then the transmission of the image package can be resumed when the client system comes online. The server system can also control the rate at which the client systems communicate with the server system. For example, the server system may spread out the informing of client systems that image packages are ready to be retrieved so that the server system is not inundated with request to retrieve at the same time. Also, the server system may notify the client system to change their heartbeat delay for the next heartbeat communications or for all future heartbeat communications. Thus, the server system may use various throttling techniques to control communications with the client systems.

FIG. 1 is a block diagram illustrating components of the distribution system in one embodiment. The distribution system includes a server system 101 connected to client systems 102 via a communications link 105, such as the Internet. The server system maintains a database of information 103 containing the state of each client system, customer information, and content (e.g., images) to be distributed. The server system may provide a packaging component to allow images to be packaged for distribution. The packaging component may customize the image packages to each client system. The customization may be based on the image plan and image update frequency of each client. For example, one client system may be subscribed to a modern art image plan to be updated monthly, and another client system may be subscribed to an outdoor photography image plan to be update weekly. A distribution component of the server system is responsible for distributing the image packages to the appropriate client system at the designated times. The server system may also provide configuration information to each client system to control the display of the images, communications with a server system, and so on. The distribution system may also provide a content web site 104 for access by customers of the distribution system. The content web site may allow a customer to subscribe to various plans, to upload images for distribution by the server system to the customer's client system, and so on.

The client systems and server system may include a central processing unit, memory, input devices (e.g., keyboard and pointing devices), output devices (e.g., display devices), and storage devices (e.g., disk drives). The memory and storage devices are computer-readable media that may contain instructions that implement the distribution system. In addition, the data structures and message structures may be stored or transmitted via a data transmission medium, such as a signal on a communications link. Various communications links may be used, such as the Internet, a local area network, a wide area network, or a point-to-point dial-up connection.

Figure 2:
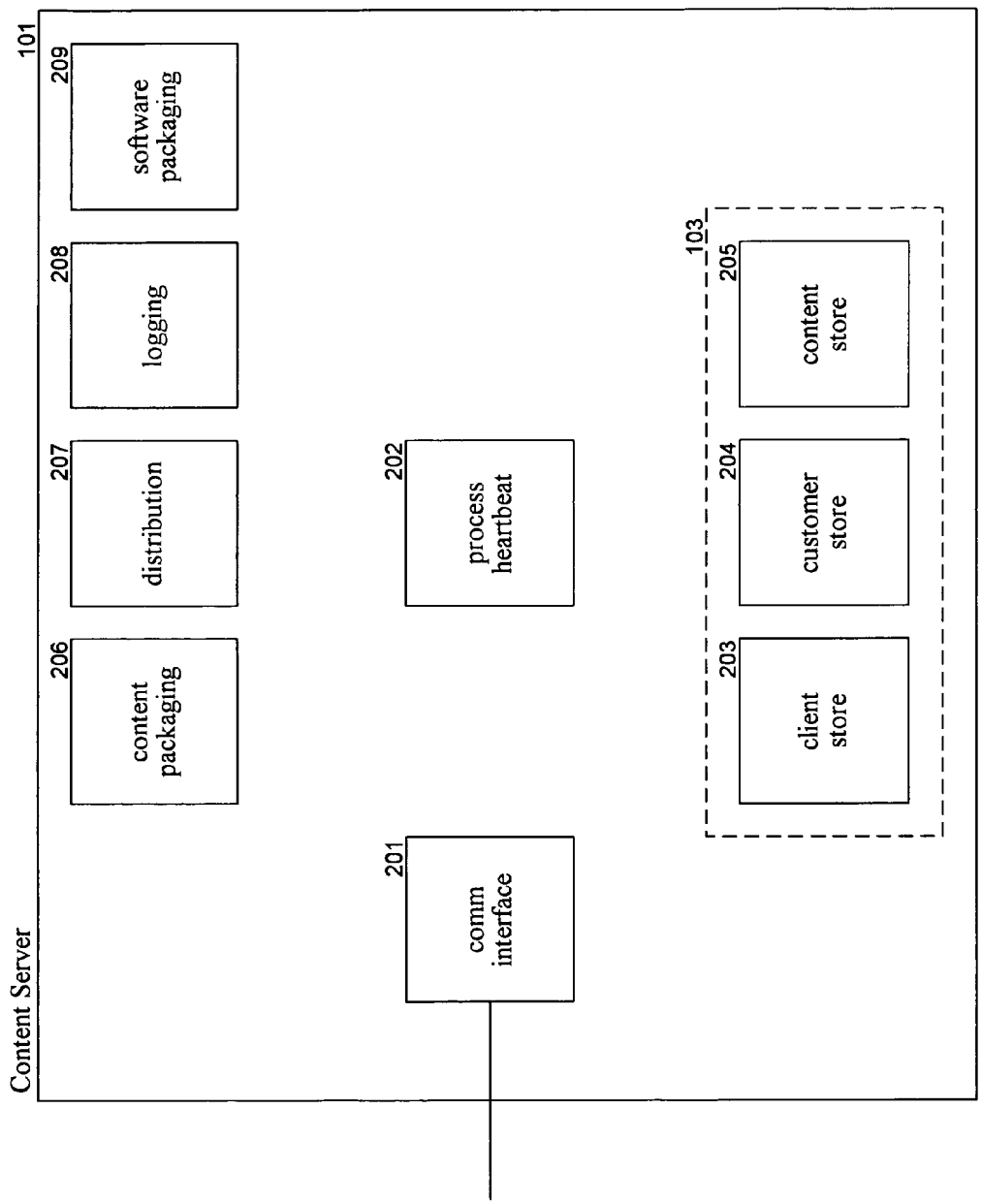
FIG. 2 is a block diagram illustrating components of the server system in one embodiment.

FIG. 2 is a block diagram illustrating components of the server system in one embodiment. The server system 101 includes a communication interface 201 through which all communications via the communications link 105 is routed. The process heartbeat component 202 receives heartbeat communications from the client systems and processes the communications as appropriate. The communications between the server system and client systems may be use an HTTP protocol via insecure port 80 or via secure port 443, or any other port. The client systems send heartbeat communications as an HTTP request periodically to the server system. The server system provides its instructions to the client systems via responses to the HTTP requests. Because the client systems initiate each communications, the server system can avoid firewall and other security problems that can occur if the server system initiated the communications. The server system includes an image packaging component 206, a distribution component 207, a logging component 208, and a software packaging component 209. The server system also includes a database 103 having a client store 203, a customer store 204, and an image store 205. The image packaging component is responsible for creating the image packages to be distributed to the client system. The image packaging component may use preference or subscription information stored in the customer store or client store in preparing the image packages using the image is contained in the image store. The software packaging component controls the packaging of software updates that are to be distributed to the client systems. The distribution component is responsible for distributing each image package to the appropriate client system at the appropriate time. The distribution component is also responsible for distributing software packages for updating the software of the client systems. The logging component is responsible for coordinating the retrieving of usage data from the client systems. In one embodiment, the server system only collects usage information from client systems that are connected to the server system via a communications link.

Figure 3:
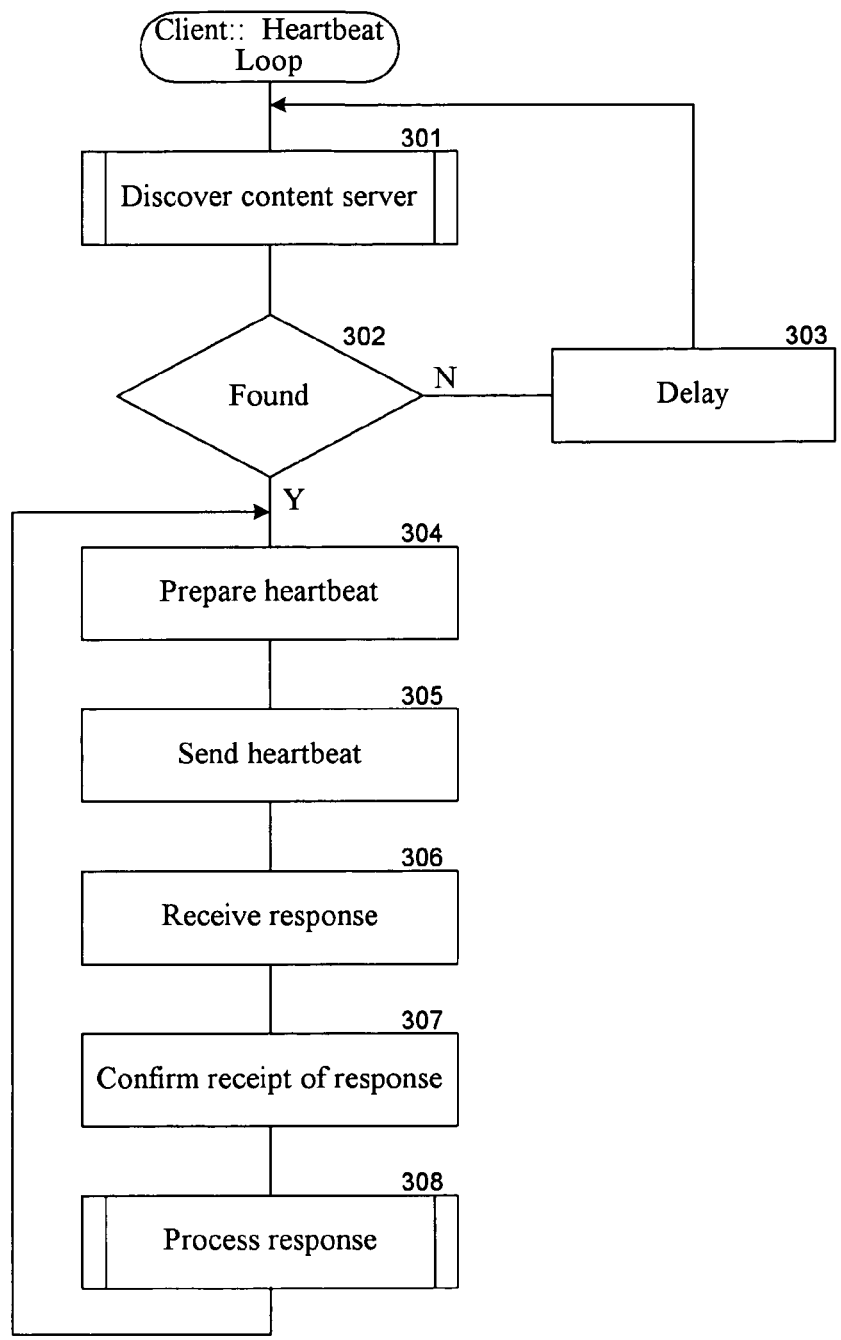
FIG. 3 is a flow diagram of an example heartbeat loop component of a client system in one embodiment.

FIG. 3 is a flow diagram of an example heartbeat loop component of a client system in one embodiment. The heartbeat loop periodically sends out heartbeat communications via an HTTP request to the server system so that the server system can send instructions via an HTTP response. In block 301, the component discovers the location of the server system. In decision block 302, if the server system was discovered, then the component continues that block 304, else the component continues at block 303. In block 303, the component delays for a specified time before retrying to discover the server system by looping to block 301. As described above, the client system can optionally be connected to the server system via a communications link. In blocks 304-308, the component loops sending heartbeat communications and processing the responses. In block 304, the component prepares a heartbeat communication. The heartbeat communication may contain the IP address of the client system, a unique client system identification, a programmatic client system identification provided by the server system, a current action, an operating status, and a time step. The programmatic identification may be a random number provided by the server system in the last communication with the client system as to help prevent spoofing of a client system. In block 305, the component sends the heartbeat communication to the server system. In block 306, the component receives the response to the heartbeat communication from the server system. In block 307, the component acknowledges receipt of the response by sending an HTTP request (i.e., another heartbeat communication) to the server system. The acknowledgment may indicate whether the response was correctly received, the response should be resent, or the client system is currently busy. In block 308, the component processes the response received in block 306. The component then loops to block 304 to prepare the next heartbeat communication.

Figure 4:
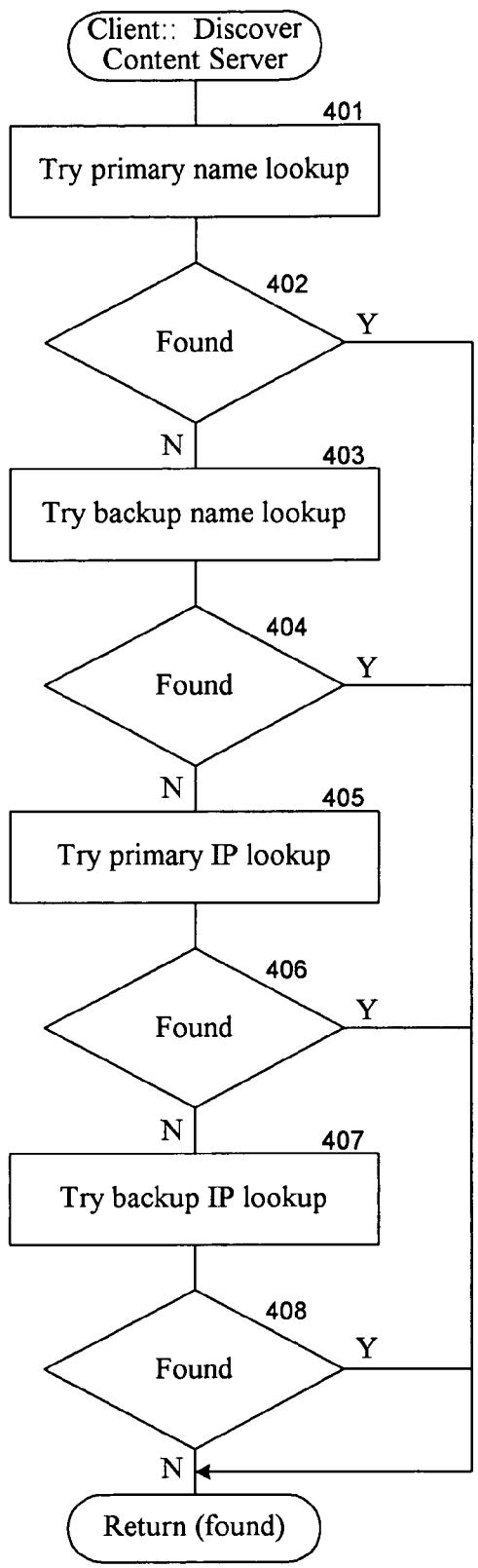
FIG. 4 is a flow diagram illustrating the processing of the discover component of a client system in one embodiment.

FIG. 4 is a flow diagram illustrating the processing of the discover component of a client system in one embodiment. In block 401, the component tries to connect to the server system using one more primary names (e.g., https://server.host1.net) associated with the server system. In decision block 402, if the connection is established, then the component returns, else the component continues at block 403. In block 403, the component tries to connect to the server system using one or more backup names (e.g., http://server.host2.net) associated with the server system. In decision block 404, if a connection is established, then the component returns, else the component continues at block 405. In block 405, the component tries to connect to the server system using one or more primary Internet protocol addresses. In decision block 406, if a connection is established, then the component returns, else the component continues at block 407. In block 407, the component tries to connect to the server system using one or more backup Internet protocol addresses. In decision block 408, if a connection is established, then the component returns an indication that a connection has been established, else the component returns an indication that a connection has not been established.

Figure 5:
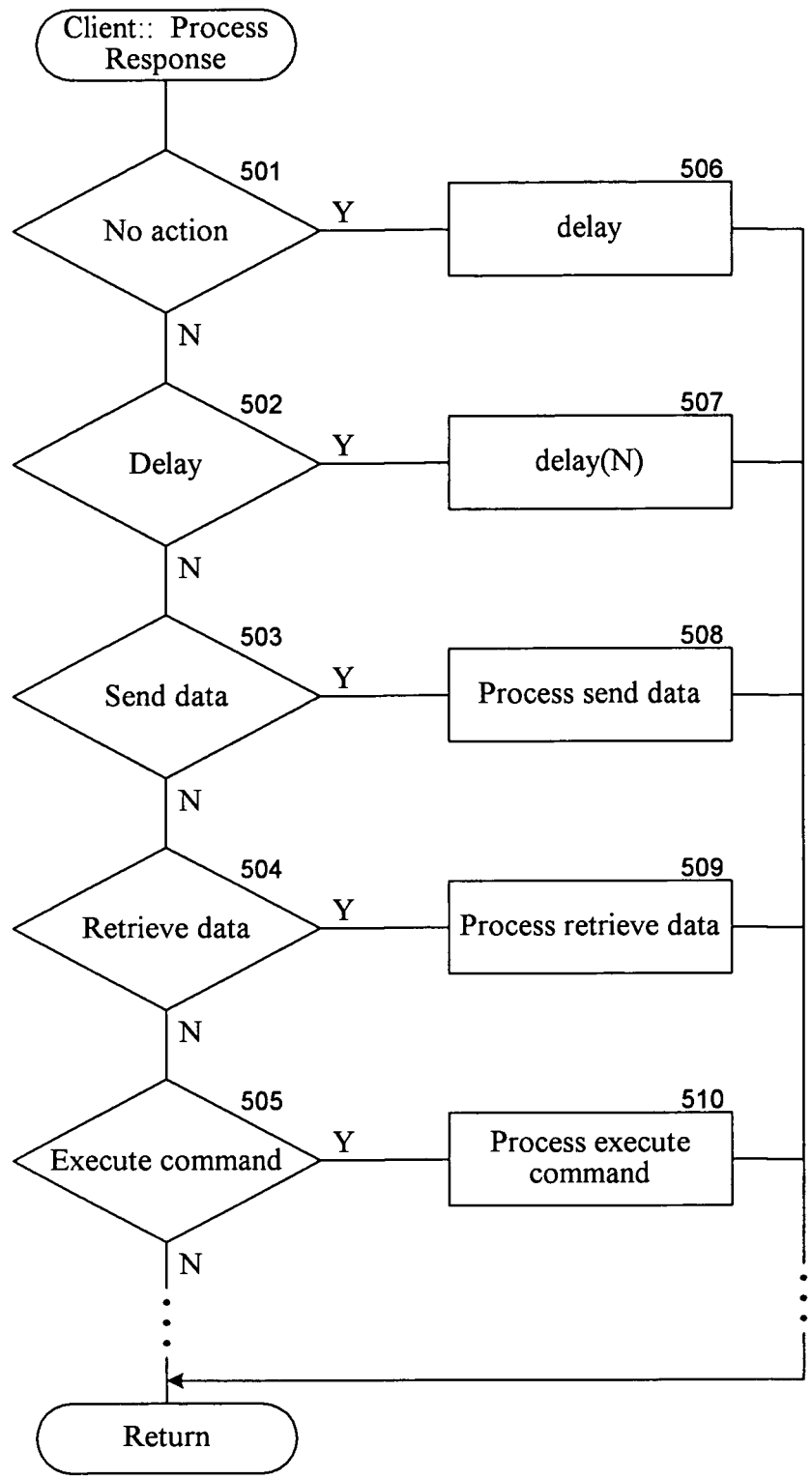
FIG. 5 is a flow diagram illustrating processing by a client system of a response in one embodiment.

FIG. 5 is a flow diagram illustrating processing by a client system of a response in one embodiment. In decision block 501, if the response indicates that no action is to be taken, then the component continues at block 506, else the component continues at block 502. In block 506, the component effects the delay between heartbeat communications and then returns to send the next heartbeat communication. In decision block 502, if the response indicates a designated delay amount, then the component continues at block 507, else the component continues at block 503. In block 507, the component delays the designated amount and then returns. The server system may provide a delay if, for example, the server system is will be unavailable for a certain period. In decision block 503, if the response indicates to send data, then the component continues at block 508 to process the send data instruction, else the component continues at block 504. The response may indicate to send usage data to the server system or to another designated system. In decision block 504, if the response indicates that the client system should retrieve data (e.g., an image package), then the component continues at block 509 to process the retrieve data instruction, else the component continues at block 505. In decision block 505, if the response indicates to execute a command, then the component continues at block 510 to process the execute command instruction, else the component continues processing the response as appropriate as indicated by the ellipses.

Figure 6:
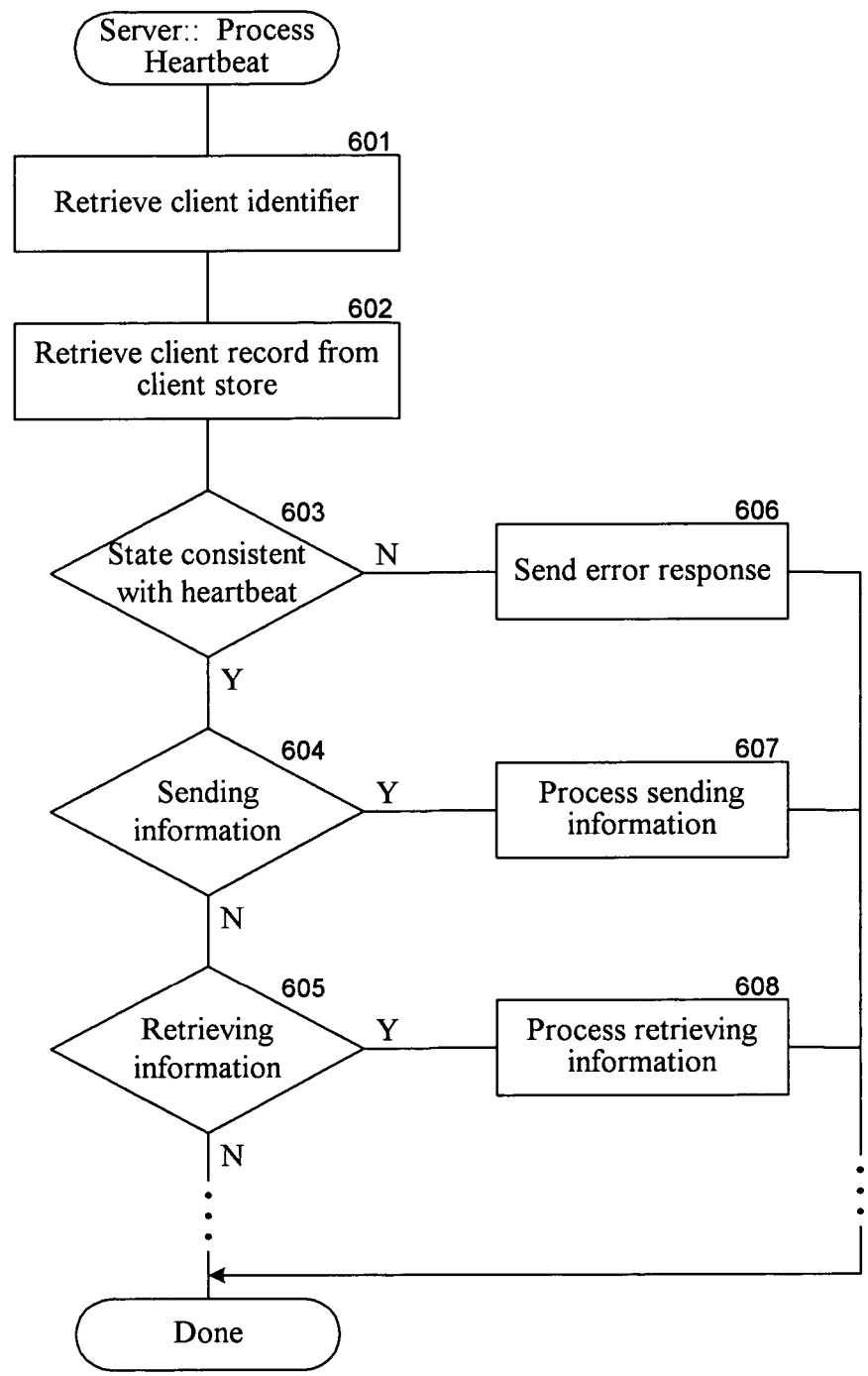
FIG. 6 is a flow diagram illustrating example processing of a server system when it receives a heartbeat communications from a client system.

FIG. 6 is a flow diagram illustrating example processing of a server system when it receives a heartbeat communications from a client system. In block 601, the component retrieves the client identifier from the heartbeat communication. In block 602, the component retrieves a client record from the client store and may retrieve a customer record from the customer store. In decision block 603, if the state of the client system is consistent with the heartbeat communications (e.g., the proper sequence within a session), then the component continues at block 604, else the component sends a response in block 606. In decision block 604, if the client system is in the process of sending information (e.g., usage data) to the server system, then the component continues at block 607 to process the information, else the component continues at block 605. In decision block 605, if the client system is in the process of retrieving information from the server system, then the component continues at block 608 to process the retrieved information, else the component continues at processing the communication as indicated by the ellipsis.

One skilled in the art will appreciate that although specific embodiments of the distribution system have been described herein for purposes of illustration, various modifications may be made without deviating from the spirit and scope of the invention. The distribution system may provide a variety of subscription plans, display options, and control options for the display of images. The subscription plans may allow a customer to subscribe to various channels or galleries (e.g., modern art) for each client system. A subscription plan may include a permanent set of images that is always included in the display list and a transient set of images that may change frequently. In one embodiment, the distribution system may allow a customer (e.g., via a web site) to specify that channels to be sent to a client system and to specify which images are to be permanently in the display list. The distribution system may also allow the user to upload images via the web site that are to then distributed to the designated client systems for display. For example, a business may upload pictures of a company picnic so they can be displayed. The distribution system may also allow for the displaying of brand information (e.g., a company logo) along with the images. The brand information may be uploaded via the web site for distribution to the client systems. A subscription plan may also allow for the displaying of credits (e.g., artist name) along with the images. A client system can display the credit information on a separate monitor, superimposed on the images, before and after a display of an image, and so on. The distribution system may also allow a customer to, using the web site, specify the scheduling for the display of images for a client system. A client system may allow the display of images to be interrupted to display information, such as a building directory or a news alert that may be identified using zip code information. Accordingly, the invention is not limited except by the appended claims.

We claim:

1. A method of using a distribution system for distributing images to client systems, the method comprising:
 tracking communications received at the distribution system from a client system via a communications link, wherein a communication received from the client system includes a time associated with the communication; and
 for an image that is to be distributed by the distribution system to a client system,
  determining whether a time associated with a most recently received communication from the client system is within a certain time period;
  based on the determining, evaluating whether to send the image to the client system via the communications link or via a mechanism other than the communications link.

2. The method of claim 1 wherein tracking communications includes tracking communications occurring over the Internet.

3. The method of claim 1 wherein evaluating whether to send the image to the client system via a mechanism other than the communications link includes evaluating whether to send the image to the client system via a physical computer-readable medium.

4. The method of claim 3 wherein evaluating whether to send the image to the client system via a mechanism other than the communications link includes evaluating whether to send the image to the client system via a disc-based medium.

5. The method of claim 1, further comprising, in response to determining that the sending of the image to the client system via the communications link fails, sending the image to the client system via a mechanism other than the communications link.

6. The method of claim 1 wherein tracking communications includes tracking a heartbeat signal that is received from the client system and that is sent periodically to the distribution system.

7. The method of claim 1, further comprising:
determining whether a time at which the image is to be distributed by the distribution system to the client system is within a threshold time period of the most recently received communication from the client system.

8. The method of claim 1, further comprising:
in response to determining that the time associated with the most recently received communication is within the certain time period, sending the image to the client system via the communications link.

9. The method of claim 1 wherein tracking communications includes tracking communications transmitted from the client system is transmitted at the initiative of the client system.

10. The method of claim 1, further comprising:
in response to determining that the time associated with the most recently received communication is not within the certain time period, sending the image to the client system via a mechanism other than the communications link.

11. An image distribution computing system having a processor and memory, the system comprising:
a component that is configured to receive via a communications link communications from client systems;
a component that is configured to provide packages of images to be distributed to client systems;
a component that is configured to determine, for a package of images that is to be distributed to a client system, whether to distribute the package of images to the client system via the communications link or via a mechanism other than the communications link based on when the client system last communicated with the image distribution computing system via the communications link; and
a component that is configured to direct the distribution of a package of images to a client system in accordance with the determination,
wherein the components are implemented as instructions stored in the memory for execution by the processor.

12. The system of claim 11 wherein the component that is configured to receive communications is configured to receive the communications from the Internet.

13. The system of claim 11 wherein the mechanism is a physical computer-readable medium.

14. The system of claim 13, further comprising a component that is configured to record the package of images on the computer-readable medium.

15. The system of claim 11 wherein the component that is configured to receive communications from the client systems is configured to receive heartbeat communications from the client systems.

16. The system of claim 11, further comprising a component that is configured to send via the communications link the package of images to the client system.

17. The system of claim 11 wherein the package of images includes images selected based on preferences for the client system to which the package is to be sent.

18. The system of claim 11 wherein the component that is configured to receive communications is configured to receive communications transmitted at the initiative of the client system.

19. The system of claim 11 wherein the component that is configured to determine whether to distribute the package of images is configured to determine how to distribute the package to the client system based on whether a time at which the package of images is to be distributed is within a threshold time period of when the client system last communicated with the image distribution computing system via the communications link.

20. A method in a computer system for distribution of images to a client system, the method comprising:
receiving via the Internet heartbeat communications from a client system, the heartbeat communications being HTTP requests;
recording an indication of receipt of the heartbeat communications from the client system, wherein the indication includes a time associated with the receipt of the heartbeat communications;
determining whether to send an image to the client system via the Internet or via another mechanism based on when a heartbeat communication was last received from the client system as indicated by the recorded indications of the receipt of heartbeat communications; and
sending the image to the client system via the Internet or via the other mechanism based on the determination.

21. The method of claim 20 wherein determining whether to send the image via the Internet or via another mechanism is further based on whether a time at which the image is to be sent to the client system is within a threshold time period of when the heartbeat communication was last received from the client system.

22. The method of claim 20 wherein sending the image to the client system includes sending the image via a physical computer-readable medium.

23. The method of claim 22 wherein sending the image to the client system includes sending the image via a disc-based medium.

24. The method of claim 22, further comprising recording the image on the computer-readable medium.

25. The method of claim 20 wherein receiving heartbeat communications includes receiving heartbeat communications from the client system that are transmitted at the initiative of the client system.

26. A tangible computer-readable medium having stored thereon instructions, the instructions comprising:
instructions to track communications received at a computing system from a client system via a communications link, wherein a communication received from the client system includes a time associated with the communication; and
for an image that is to be distributed by the computing system to a client system, instructions to,
determine whether a time associated with a most recently received communication from the client system is within a certain time period;
in response to determining that the time associated with the most recently received communication from the client system is within the certain time period, send the image to the client system via the communications link; and in response to determining that the time associated with the most recently received communication from the client system is not within the certain time period, send the image to the client system via a mechanism other than the communications link.

27. The computer-readable medium of claim 26 wherein the instructions to track communications include instructions configured to track communications received from the client system that are transmitted at the initiative of the client system.

28. The computer-readable medium of claim 26 wherein the instructions to track communications include instructions configured to track heartbeat signals that are sent periodically to the computing system by the client system.

29. The computer-readable medium of claim 26, wherein the instructions further comprise:

instructions to determine whether a time at which the image is to be distributed to the client system is within a threshold time period of the most recently received communication from the client system.

\* \* \* \* \*